Sept. 2, 1958     C. J. QUILL     2,850,693

ALTERNATING CURRENT RECTIFIER

Filed April 11, 1955

INVENTOR.
CHARLES J. QUILL
BY
ATTORNEY though the coil 32 from the terminal 39 to the line 34 the other segment 7 is in meshing contact with the conductor gear 1 so that a direct current will be delivered to the work A in one direction, and during the alternation the segments 6 and 7 will be in such position that the conductor gear 1 will not be in mesh with either.

United States Patent Office 2,850,693
Patented Sept. 2, 1958

2,850,693

ALTERNATING CURRENT RECTIFIER

Charles J. Quill, San Francisco, Calif.

Application April 11, 1955, Serial No. 500,476

8 Claims. (Cl. 321—50)

This invention relates to an alternating current rectifier.

The primary object of this invention is to provide a very simple and efficient form of alternating current rectifier mechanism which will be capable of supplying direct current to batteries, galvanizing tanks, or other appliances, or methods and devices; the said mechanism being such as to obviate the necessity for brushes, commutators, or pole changers, or the like, and yet easily convert alternating current into pulsating direct current.

Another object of the invention is to provide an alternating current rectifier in which the current is rectified through suitable meshing gears one of which is a conductor gear and the other of which is provided with alternating sections of conductive and non-conductive segments in mesh with the conductor gear so as to transmit electric current from a transformer in synchronism with the wave of the alternating current and provide through the conductor gear a pulsating direct current suitable for the particular purpose or appliance where the direct current is needed.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
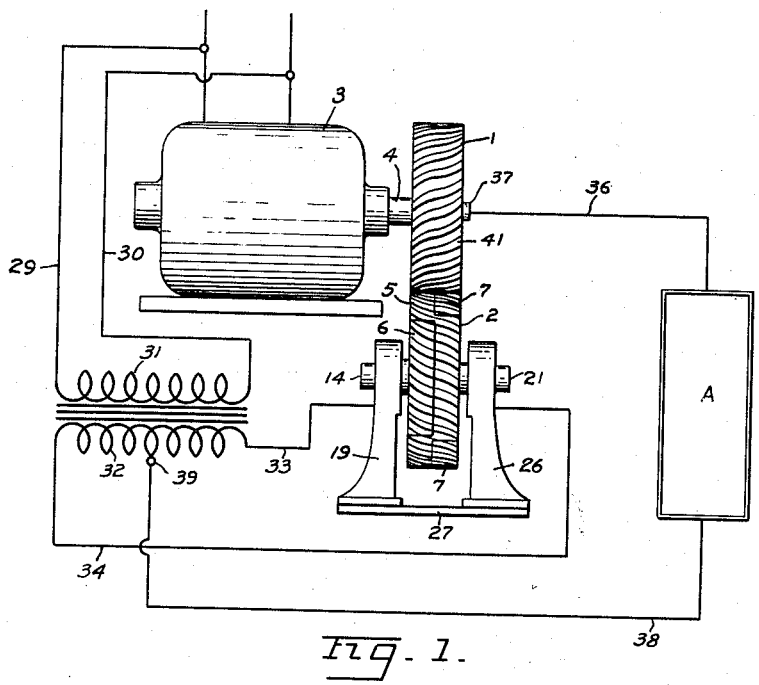
Fig. 1 is a partly diagrammatic view of my rectifier mechanism.
Figures 2, 3:
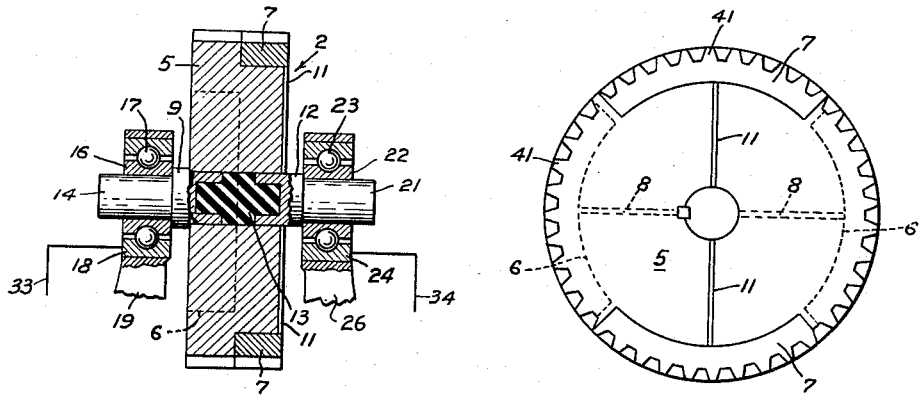
Fig. 2 is a cross-sectional view of my converting gear and the electrical connections on the same.
Fig. 3 is a face view of my converting or rectifying gear.

In carrying out my invention I utilize a conductor gear 1 which is in mesh with a rectifier gear 2. The conductor gear 1 is mounted on and is driven by an electric motor 3. This electric motor 3 is preferably a synchronous motor capable of making 1800 R. P. M. where 60 cycle alternating current is used, or such that the speed in R. P. M. of the synchronous motor is generally one half the frequency per minute for the alternating current supply.

In the present illustration, this electric motor 3 is a four pole motor. The conductor gear 1 is mounted on the shaft 4 of the synchronous motor 3 to be rotated by the same.

The rectifier gear 2 is made generally of an insulating body 5 into which are imbedded integrally peripheral sets of alternating conductor gear segments 6 and 7. The two spaced gear sectors 6 are on the periphery of one vertical half of the gear 2 while the other two spaced gears 7 are on the periphery of the other vertical half of the gear 2. The respective gear segments are spaced and insulated from one another. These gear segments are made of any suitable electrical conductive metal, such as copper.

In the present illustration there are two sets of such gear segments 6 and 7 on the respective vertical halves of the rectifier gear 2. The conductor segments 6 are connected by imbedded generally radial lines 8 to a conductor shaft section 9. The conductor segments 7 on the other vertical half of the gear 2 are connected by generally radial conductor lines 11 to a conductor shaft section 12. The conductor shaft sections 9 and 12 are united together by an insulating shaft section 13.

The conductor shaft section 9 has a reduced end 14 on which is provided the inner race 16 of a ball bearing the balls 17 of which rotate in a stationary outer race 18 which latter in turn is fixed in a bracket 19. Electricity is conducted to the stationary race 18 either directly or through the bracket 19, and the electricity is taken off by the balls 17 and the rotating race 16 and shaft end 14 to be conducted to the respective conductor gear peripheral segments 6.

The other conductor shaft section 12 has a reduced end 21 which has on it a rotating race 22, which rotates on ball bearing 23 which latter are nested and rotate in a stationary race 24 supported in a bracket 26. Electricity is conducted to the stationary race 24 and again is taken off by the balls 23 and rotating race 22 and shaft end 21 to be conducted through the shaft section 12 and conductor 11 to the other pair of peripheral segments 7.

The brackets 19 and 26 may be of insulating material and the electrical wiring is directly connected to the respective stationary races 18 or 24; or the brackets 19 and 26 may be made of conductor material and be the conductors and insulated from one another by a suitable insulating base 27 as shown in Fig. 1.

For the operation of this rectifier the alternating current is introduced through lines 29 and 30 to the primary coil 31 of a transformer of the usual type. The secondary coil 32 of the transformer has one end thereof connected by a line 33 to the stationary race 18 adjacent the shaft section 9 to provide electricity to the peripheral gear segments 6. The other end of the secondary coil 32 is connected by a line 34 to the stationary race 24 conducting electricity to the other shaft section 12 and to the other peripheral segments 7.

A positive line 36 leads from the shaft 37 of the conductor gear 1 to the work A. The shaft 37 is constructed and journalled in a conductor ball bearing in the manner heretofore described in connection with the conductor bearings of the rectifier gear 2. The negative line 38 leads from the work A to a central terminal 39 of the secondary coil 32 of the transformer. The work represented at "A" in Fig. 1 may be either a battery or a galvanizing tank or fertilizer container, or the like, through which direct current is to be conducted and utilized.

In order to prevent arcing and accomplish better conduction of electric current the gear teeth 41 of the gears are of spiral helical shape so that one end of one tooth is still in contact while the adjacent end of the next tooth engages the next tooth of the other gear. This results in a motion which could be described as a wiping contact between the respective spiral helical meshing teeth.

In operation the gears 1 and 2 are rotated at such rate of relative speed that while the alternating current passes toward one end of the secondary coil 32 to the line 33 one of the segments 6 is in meshing contact with the conductor gear 1, and while the alternating current passes in reverse or opposite direction through line 34 then one of the segments 7 on the other side of the rectifier gear 2 is in mesh with the conductor gear 1. Thus the meshing contacts of the opposite or alternating gear segments 6 and 7 with the conductor gear 1 alternate in synchronism with the alternating of the current. The pulsating direct current so produced flows through the conductor gear 1 through the positive line 36 and then through the work A and finally through the negative line 38 and then to the central terminal 39 of the secondary transformer coil 32.

The meshing contact between gears 1 and 2 accomplishes double function of conducting electricity and also the conductor gear 1 drives the rectifying or converting gear 2 at the proper ratio with respect to the synchronous motor and alternating of the current.

The transformer may be a step-down or step-up transformer according to need. For instance, when the direct current is used for charging battery or galvanizing or plating a step-down transformer is used. When the direct current is used in treating fertilizer or the like a step-up transformer is used.

When the herein rectifier is used in connection with apparatus which have counter electro motive force, such as batteries or motors or welding apparatus, then the circumferential spacing between the alternate rectifying segments 6 and 7 is determined so that each segment makes and breaks contact with the conductor gear at such a part of the respective sine wave of the alternating current which is the same or higher voltage as the said counter electro motive force of the work, such as in multiple battery charging. When used in connection with work requiring a step-up high voltage transformer the circumferential spacing between alternate segments 6 and 7 is increased so as to utilize only the portions nearest the peaks of the respective alternating current sine waves. In this manner sparkless commutation is achieved.

I claim:

1. A rectifier device for an alternating current rectifier comprising a rotating conductor element adapted to be driven by a synchronous motor, a rotating rectifier element driven by said conductor element, and means to rotatably support said rectifier element, said rectifier element including an insulating body, alternating conductor segments offset axially to opposite sides on the periphery of said body, bearing means in said support means, and means to connect said alternating conductor segments to opposite ends of a transformer, said conductor segments being adapted to be in electrical conductive contact with the periphery of said conductor element, and a line connecting said conductor element to a work.

2. In an alternating current rectifier, the combination with a source of alternating current supply, a synchronous motor and a transformer connected therewith; of a rectifier device comprising a rotating conductor element driven by said motor, a rotating rectifier element driven by said conductor element, and means to rotatably support said rectifier element, said rectifier element including insulating body, alternating conductor segments on the periphery of said body, bearing means in support means, and means to connect the opposite ends of the secondary coil of said transformer alternately to said alternating conductor segments, said conductor segments being adapted to be in electrical conductive contact with the periphery of said conductor element a line connecting said conductor element to a work, and another line leading from said work approximately to the center of said secondary coil, said rotating conductor element having peripheral gear teeth, and the periphery of said driven element being formed with gear teeth meshing with the teeth of said conductor element.

3. In an alternating current rectifier, the combination with a source of alternating current supply, a synchronous motor and a transformer connected therewith; of a rectifier device comprising a rotating conductor element driven by said motor, a rotating rectifier element driven by said conductor element, and means to rotatably support said rectifier element, said rectifier element including insulating body, alternating conductor segments on the periphery of said body, bearing means in support means, and means to connect the opposite ends of the secondary coil of said transformer alternately to said alternating conductor segments, said conductor segments being adapted to be in electrical conductive contact with the periphery of said conductor element, a line connecting said conductor element to a work, and another line leading from said work approximately to the center of said secondary coil, said rotating conductor element having peripheral gear teeth, and the periphery of said driven element being formed with gear teeth meshing with the teeth of said conductor element, the said gear teeth being of a spiro-helical shape so that adjacent gears are in overlapping relation and the respective contacts of subsequent gears overlap.

4. In an alternating current rectifier, the combination with a source of alternating current supply, a synchronous motor and a transformer connected therewith; of a rectifier device comprising a rotating conductor element driven by said motor, a rotating rectifier element driven by said conductor element, and means to rotatably support said rectifier element, said rectifier element including insulating body, alternating conductor segments on the periphery of said body, bearing means in support means, and means to connect the opposite ends of the secondary coil of said transformer alternately to said alternating conductor segments, said conductor segments being adapted to be in electrical conductive contact with the periphery of said conductor element, a line connecting said conductor element to a work, and another line leading from said work approximately to the center of said secondary coil, said rotating conductor element having peripheral gear teeth, and the periphery of said driven element being formed with gear teeth meshing with the teeth of said conductor element, the said gear teeth being of a spiro-helical shape so that adjacent gears are in overlapping relation and the respective contacts of subsequent gears overlap, said bearing means including a pair of stationary races connected respectively to the opposite ends of the secondary coil of said transformer, rotating elements in said stationary races in conductive contact therewith, shaft elements in contact with said rotating bearing elements being conductive and being connected to the respective alternating segments, and means to insulate the opposite conductive shaft elements from one another.

5. In an alternating current rectifier, the combination with a source of alternating current supply, a synchronous motor and a transformer connected therewith; of a rectifier device comprising a rotating conductor element driven by said motor, a rotating rectifier element driven by said conductor element, and means to rotatably support said rectifier element, said rectifier element including insulating body, alternating conductor segments on the periphery of said body, bearing means in support means, and means to connect the opposite ends of the secondary coil of said transformer alternately to said alternating conductor segments, said conductor segments being adapted to be in electrical conductive contact with the periphery of said conductor element, a line connecting said conductor element to a work, and another line leading from said work approximately to the center of said secondary coil, the circumferential spacing between adjacent alternating conductor segments determining generally the rectified portions of the alternating current sine waves capable of overcoming counter electro motive loads on the rectified side of the device for producing sparkless commutation.

6. In a current converting device for an alternating current rectifier, a rotating conductor gear, and a rotating converter gear having its teeth in driving contact with the teeth of the conductor gear, said converter gear including an insulating body, and a plurality of spaced conductor gear segments on the periphery of said body being alternately offset to opposite sides of the axial plane of said converter gear, and means to connect opposite poles of an alternating current to segments on the respective opposite sides of said axial plane, and means to conduct converted electric current from said conductor gear.

7. In a current converting device for an alternating current rectifier, a rotating conductor gear, and a rotating converter gear having its teeth in driving contact with the teeth of the conductor gear, said converter gear including an insulating body, and a plurality of spaced conductor gear segments on the periphery of said body being alternately offset to opposite sides of the axial plane of said converter gear, and means to connect opposite poles of an alternating current to segments on the respective opposite sides of said axial plane, and means to conduct converted electric current from said conductor gear, the gear teeth of said gears being spiral helical shape so formed that the trailing end of each tooth overlaps the leading end of the next adjacent tooth in contacting the respective opposite teeth.

8. In a current converting device for an alternating current rectifier, a rotating conductor gear, and a rotating converter gear having its teeth in driving contact with the teeth of the conductor gear, said converter gear including an insulating body, and a plurality of spaced conductor gear segments on the periphery of said body being alternately offset to opposite sides of the axial plane of said converter gear, and means to connect opposite poles of an alternating current to segments on the respective opposite sides of said axial plane, and means to conduct converted electric current from said conductor gear, and means to drive said conductor gear in synchronism with the alternating current with respect to said spaced alternate gear segments.

References Cited in the file of this patent

FOREIGN PATENTS

| | | |
|---|---|---|
| 903,836 | France | Feb. 5, 1945 |
| 177,476 | Austria | July 15, 1953 |
| 688,645 | Great Britain | Mar. 11, 1955 |